(12) United States Patent
Yamashita (10) Patent No.: US 7,638,925 B2
(45) Date of Patent: Dec. 29, 2009

(54) POWER SUPPLY DEVICE

(75) Inventor: Tomofumi Yamashita, Saga (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 11/462,854

(22) Filed: Aug. 7, 2006

(65) Prior Publication Data
US 2007/0046147 A1   Mar. 1, 2007

(30) Foreign Application Priority Data
Aug. 31, 2005   (JP) .............................. 2005-251624

(51) Int. Cl.
*H01L 41/107* (2006.01)
(52) U.S. Cl. ...................................... 310/318
(58) Field of Classification Search ............ 310/316.01, 310/317–319
See application file for complete search history.

(56) References Cited

U.S. PATENT DOCUMENTS

| 6,229,720 B1 * | 5/2001 | Noma et al. ................... 363/40 |
| 6,331,748 B1 | 12/2001 | Hong |
| 2001/0050513 A1 * | 12/2001 | Takeda et al. .......... 310/316.01 |

FOREIGN PATENT DOCUMENTS

| EP | 1 760 871 A1 | 3/2007 |
| JP | 8-149850 | 6/1996 |
| JP | 9-131066 | 5/1997 |
| JP | 10-127051 | 5/1998 |
| JP | 11-356053 | 12/1999 |
| JP | 2000-295861 | 7/2000 |
| JP | 2002-124395 | 4/2002 |
| JP | 3354059 | 9/2002 |
| JP | 2003-33046 | 1/2003 |
| JP | 2003-100494 | 4/2003 |
| JP | 2003-188434 | 7/2003 |

* cited by examiner

*Primary Examiner*—Walter Benson
*Assistant Examiner*—Derek J Rosenau
(74) *Attorney, Agent, or Firm*—Oblon, Spivak, McClelland, Maier & Neustadt, L.L.P.

(57) ABSTRACT

A driving circuit converts a direct current (DC) power supply voltage into an alternating current voltage of a predetermined frequency. The alternating current voltage is applied to an electrical element and boosted by a voltage resonant circuit of the electrical element. Based on a change in input voltage of the electrical element and a frequency component of a feedback voltage corresponding to the output voltage of the electrical element, an input voltage monitoring circuit generates an optimal control signal, and, using the optimal control signal, adjusts the DC power supply voltage such that a step-down chopper circuit is switched on and off at a predetermined duty ratio.

6 Claims, 8 Drawing Sheets

BACKGROUND ART

POWER SUPPLY DEVICE

CROSS-REFERENCE TO RELATED APPLICATIONS

The present document incorporates by reference the entire contents of Japanese priority document, 2005-251624 filed in Japan on Aug. 31, 2005.

BACKGROUND OF THE INVENTION

1. Field of the Invention

The present invention relates to a power supply device that includes a voltage resonant circuit.

2. Description of the Related Art

Figure 7:
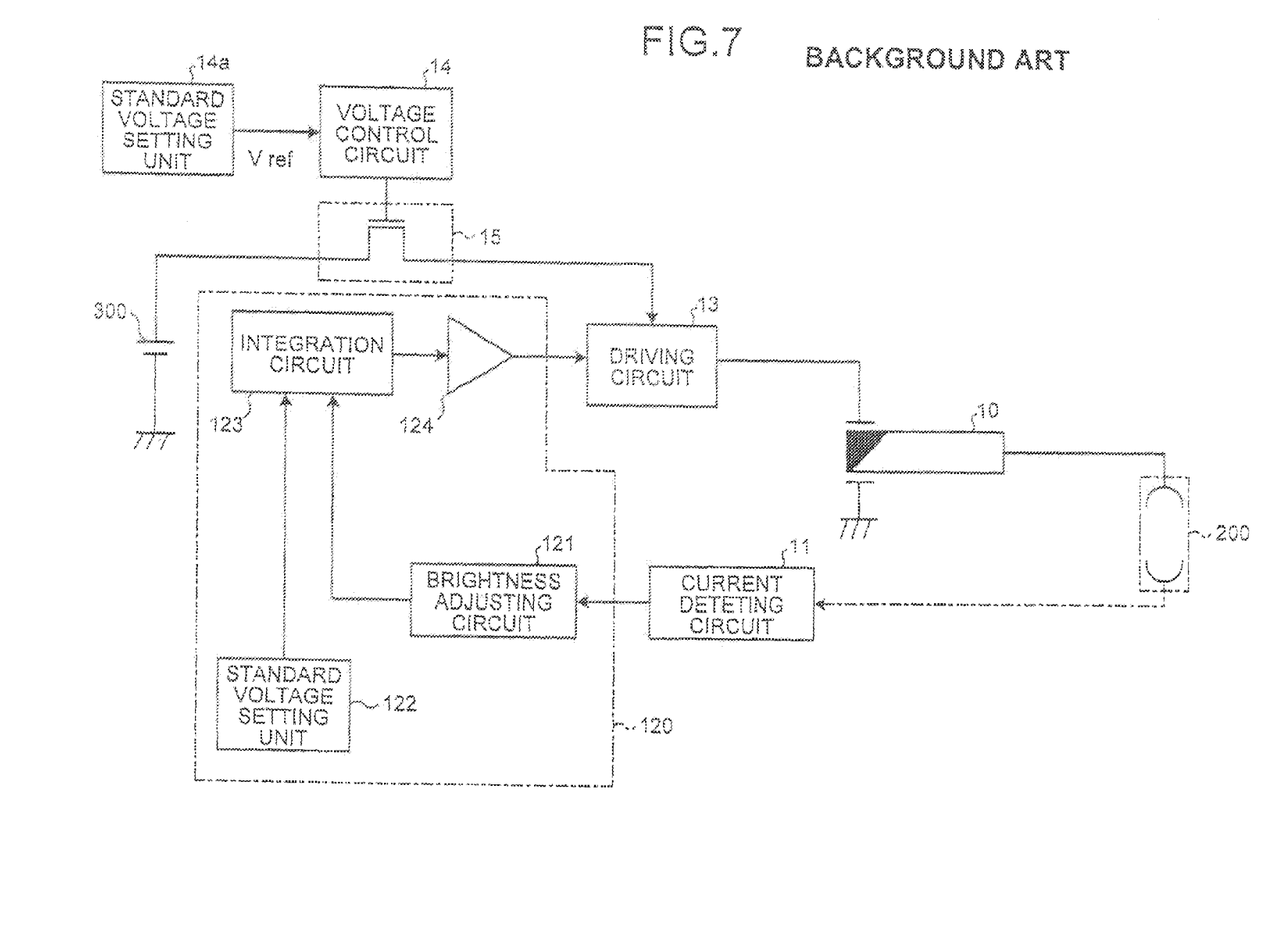
FIG. 7 is a block diagram of a conventional power supply device.
Figure 8:
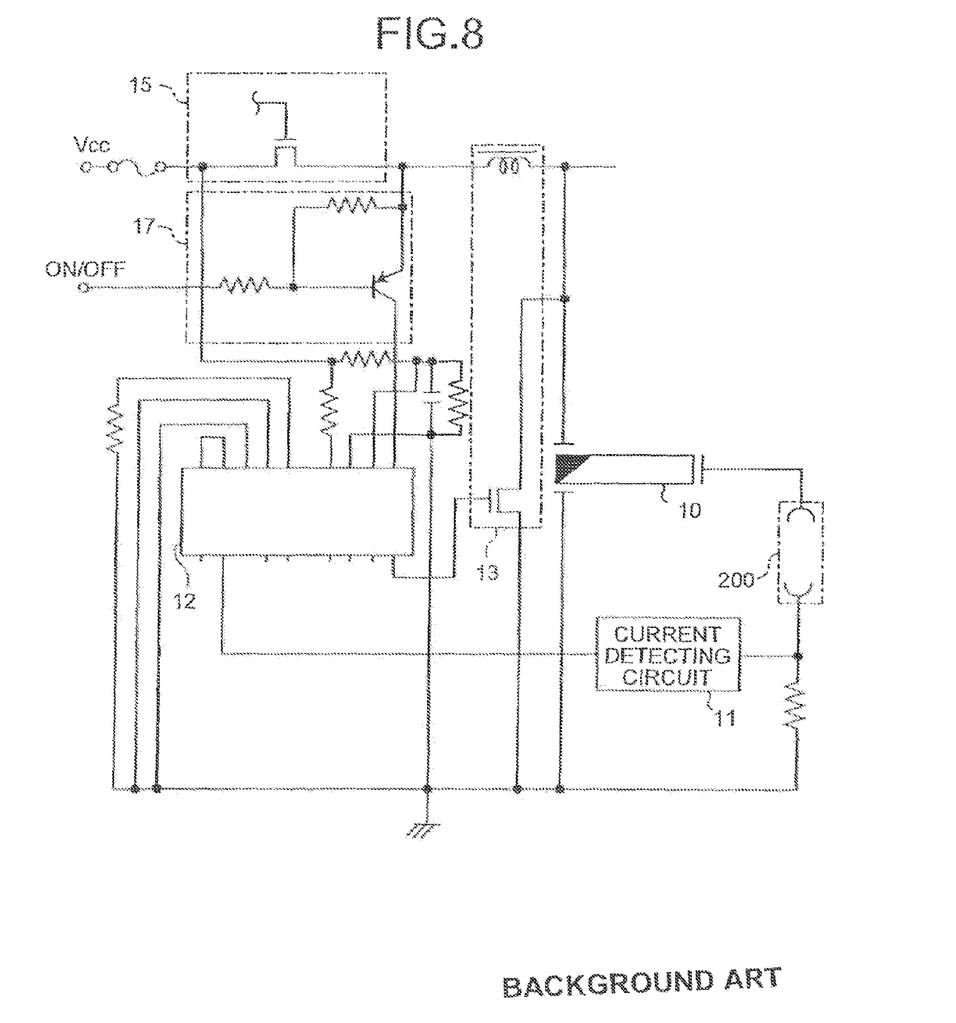
FIG. 8 is a detailed circuitry diagram of the conventional power supply device.

FIG. 7 is a conventional power supply device that causes a backlight of a liquid crystal display device to glow. FIG. 8 is a detailed circuitry diagram of the conventional power supply device.

The conventional power supply device includes a piezoelectric transformer 10, a direct current (DC) power supply 300, a cold cathode tube 200 as a load, a current detecting circuit 11, a control Integrated Circuit (IC) 120, and a driving circuit 13. The piezoelectric transformer 10 boosts a DC voltage from the DC power supply 300 at a predetermined step-up ratio, and outputs the DC voltage to the cold cathode tube 200. The current detecting circuit 11 detects a tube current flowing through the cold cathode tube 200. The control IC 120 generates a drive control signal to control the step-up ratio of the piezoelectric transformer 10 based on the detected current. The driving circuit 13 outputs to the piezoelectric transformer 10 a driving voltage of a predetermined oscillation frequency based on the control signal.

The control IC 120 includes a brightness adjusting circuit 121 that converts the tube current detected by the current detecting circuit 11 into half-wave sinusoidal voltage as a feedback voltage to adjust brightness, a standard voltage setting unit 122 that presets a standard current, an integration circuit 123 that receives and integrates the feedback voltage based on the standard current to output an integrated value, and an operating amplifier 124 that controls and calculates the control signal such that the integrated value becomes zero. The standard voltage setting unit 122, the integration circuit 123, and the operating amplifier 124 form a voltage controlled oscillator (VCO) in the control IC 120.

A power supply control operation of the conventional piezoelectric transformer is explained next. First, an activating signal ON is input to an activating circuit 17 (see FIG. 7), and the control IC 120 is supplied with voltage Vcc, and is activated.

Due to activation of the control IC 120, the driving circuit 13 outputs the voltage Vcc from the DC power supply 300 to the piezoelectric transformer 10. Based on the predetermined step-up ratio, the piezoelectric transformer 10 supplies power to the cold cathode tube 200, thereby causing the cold cathode tube 200 to start glowing. The current detecting circuit 11 detects the tube current generated when the cold cathode tube 200 is lit. The brightness adjusting circuit 121 converts the detected current into detected voltage, and inputs the detected voltage to the integration circuit 123 with standard voltage. Based on brightness set by input through a brightness setting unit (not shown) according to preference of a user of a display device that includes the cold cathode tube 200 as a backlight, the brightness adjusting circuit 121 adjusts brightness to the brightness set by the user. For example, the brightness is set to achieve a predetermined contrast by surrounding light.

Upon receiving the detected voltage as a feedback signal, the integration circuit 123 increases output voltage and lowers oscillating frequency of the VCO. The lowered oscillating frequency output from the VCO approximates resonant frequency of the piezoelectric transformer 10. Accordingly, the step-up ratio of the piezoelectric transformer 10 increases, and the cold cathode tube 200 lights up when the voltage reaches a point where the cold cathode tube 200 starts lighting.

To adjust the brightness of the cold cathode tube 200, based on a standard voltage Vref output from a standard voltage setting unit 14a, a voltage control circuit 14 drive-controls a step-down chopper circuit 15, thereby adjusting the duty ratio of DC voltage. Consequently, the regulated DC voltage is output from the DC power source 300 to the driving circuit 13. According to the duty ratio, the driving voltage output from the driving circuit 13 is output to the piezoelectric transformer 10, and a voltage based on the predetermined step-up ratio is applied to the cold cathode tube 200. Thereby, the brightness of the cold cathode tube 200 is adjusted.

In the conventional power supply device, the step-up ratio cannot change according to a change in the input voltage of the DC power supply 300 that is an input power source, and a stable power supply cannot be ensured.

In other words, in the conventional power supply device, input to the piezoelectric transformer 10 changes due to a change in the input voltage of the DC power supply 300. For example, if the input voltage of the DC power supply 300 changes from 6 volts to 22 volts, applied voltage to the piezoelectric transformer 10 is resonate to several times the input voltage and directly applied as a resonant voltage. Due to such a change in the input voltage, for ensuring a constant output, driving frequency of the piezoelectric transformer 10 is changed according to the input voltage, and the step-up ratio of the piezoelectric transformer 10 is controlled to maintain the output constant. If the input voltage changes from 6 volts to 22 volts, the driving frequency of the piezoelectric transformer 10 must be changed by around 20 Kilo-Hertz (kHz). The driving frequency is 54 kHz for the input voltage of 6 volts, and the driving frequency is 74 kHz for the input voltage of 22 volts. According to characteristics of the piezoelectric transformer 10, efficiency of the piezoelectric transformer 10 is 92 percent at a frequency of 54 kHz which is near a resonance point, while the efficiency of the piezoelectric transformer 10 significantly reduces to 40 percent at a frequency of 74 kHz away from the resonance point. Especially, when controlling brightness of a cold cathode tube that is used as a backlight in the liquid crystal display device such as a laptop computer by using a power supply device that uses a piezoelectric transformer, a brightness difference of more than 10 cd/m$^2$ occurs in the screen (at the center) depending on characteristics of the liquid crystal.

SUMMARY OF THE INVENTION

It is an object of the present invention to at least partially solve the problems in the conventional technology.

According to an aspect of the present invention, a power supply device includes an electrical element, an input voltage monitoring circuit, and a step-down chopper circuit. The electrical element includes a driving unit that converts a direct current power supply voltage into an alternating current voltage of a predetermined frequency, and a voltage resonating unit that receives the alternating current voltage through an input electrode, boosts the alternating current voltage to a predetermined level, and outputs boosted voltage to a load based on an inductance component and a capacitance component. The input voltage monitoring circuit generates, based on a change in input voltage of the electrical element and a frequency component of a feedback voltage corresponding to the voltage output from the electrical element, an optimal control signal that substantially optimizes efficiency characteristics and step-up characteristics of the electrical element. The step-down chopper circuit controls switching on and off of the direct current power supply voltage at a predetermined duty ratio based on the optimal control signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
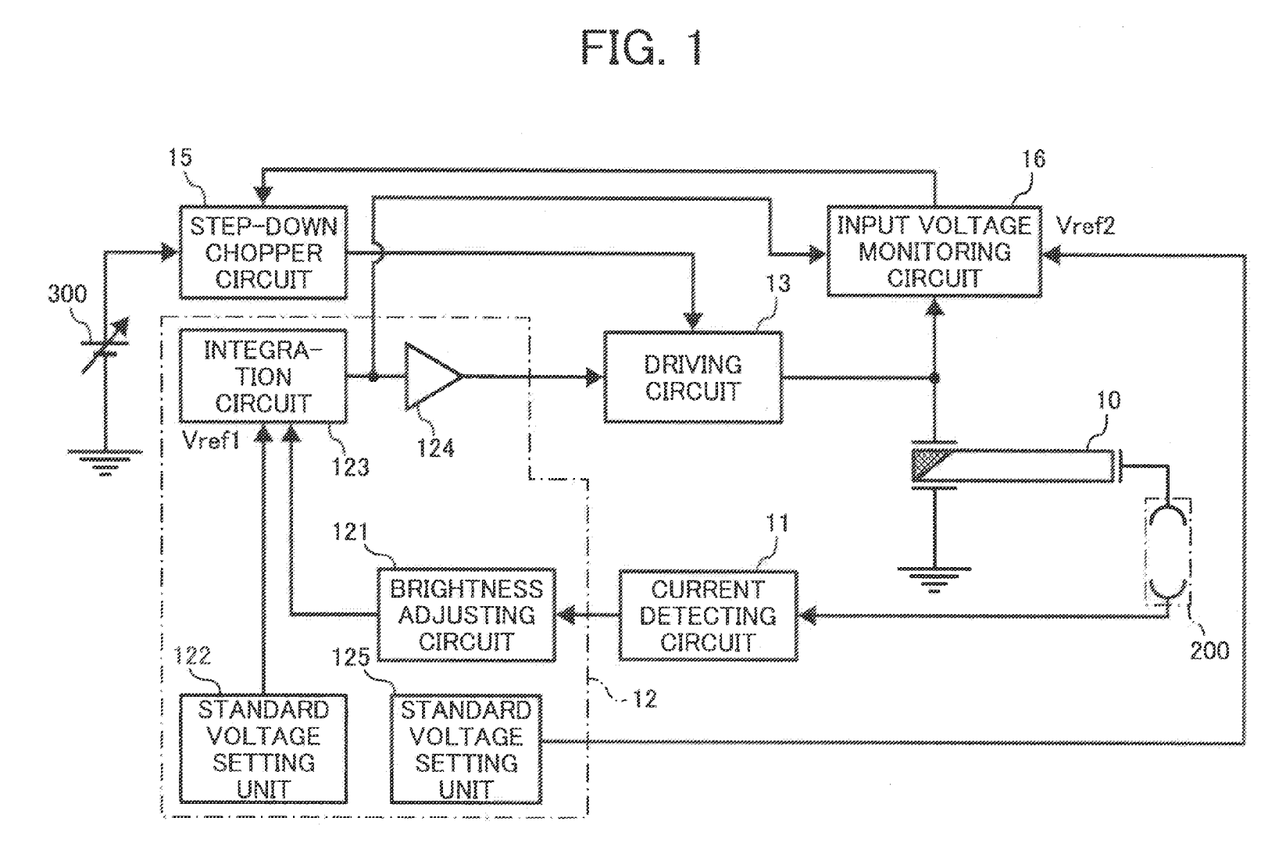
FIG. 1 is a block diagram of a power supply device according to a first embodiment of the present invention.
Figure 2:
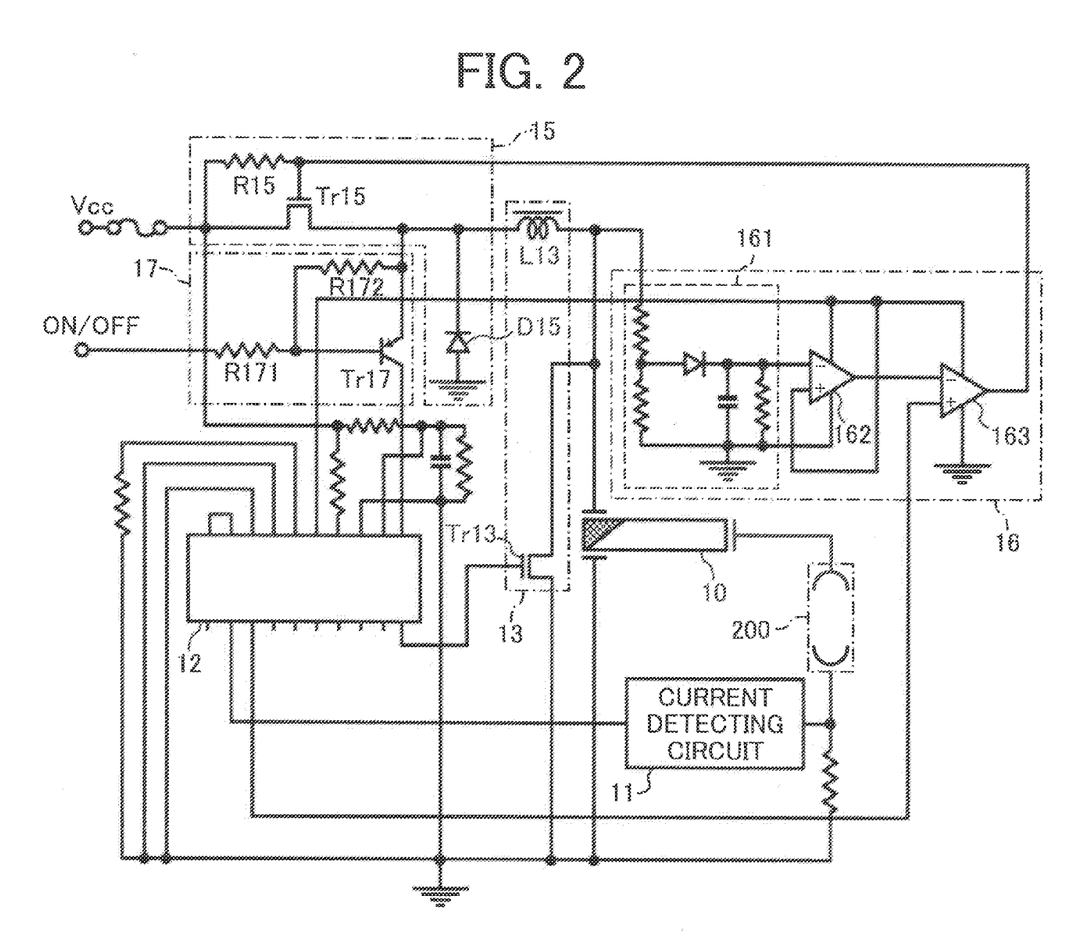
FIG. 2 is a detailed circuitry diagram of the power supply device.
Figure 3A:
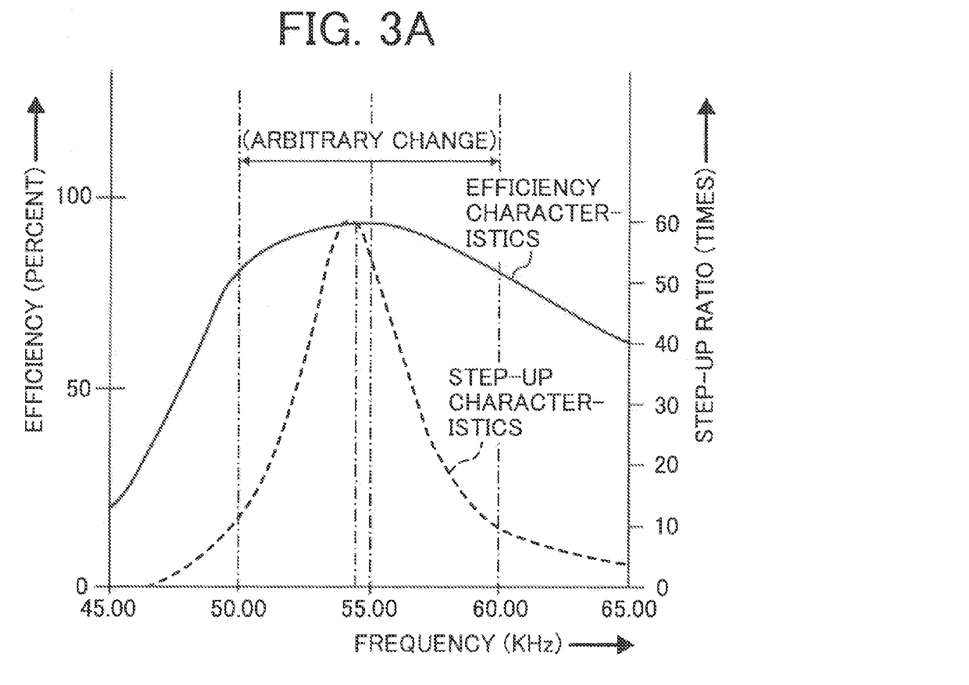
FIG. 3A is a graph of operation control characteristics of a piezoelectric transformer shown in FIG. 1.
Figure 3B:
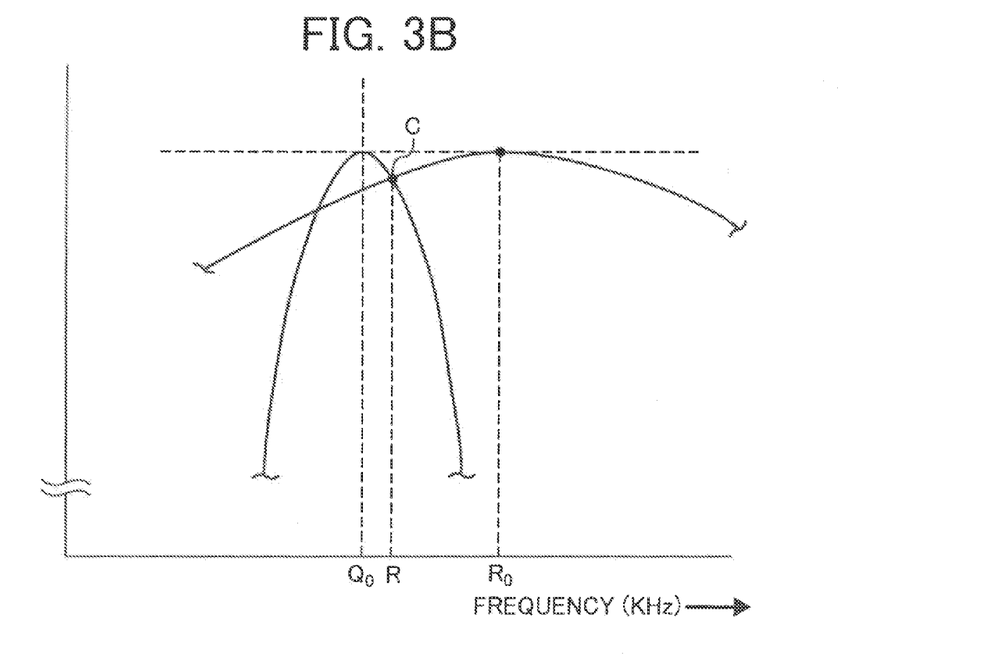
FIG. 3B is an enlargement of the relevant part of the graph shown in FIG. 3A.

A power supply device according to a first embodiment of the present invention is explained with reference to FIGS. 1, 2, 3A, and 3B. FIG. 1 is a block diagram of the power supply device. FIG. 2 is a detailed circuitry diagram of the power supply device. FIGS. 3A and 3B are graphs for explaining operation control characteristics of a piezoelectric transformer in the power supply device and an enlargement thereof.

The power supply device includes a direct current (DC) power supply 300, a driving circuit 13, a cold cathode tube 200 as a load, a piezoelectric transformer 10, a current detecting circuit 11, a control Integrated Circuit (IC) 12, an input voltage monitoring circuit 16, and a step-down chopper circuit 15.

The driving circuit 13 converts DC power supply voltage Vcc from the DC power supply 300 to alternating current (AC) voltage of a predetermined frequency. The piezoelectric transformer 10 receives the AC voltage through an input electrode, and boosts the AC voltage to a predetermined voltage to output the boosted voltage to the cold cathode tube 200.

The current detecting circuit 11 detects a tube current flowing through the cold cathode tube 200. The control IC 12 generates drive control signals to control a step-up ratio of the piezoelectric transformer 10 based on the current detected by the current detecting circuit 11. The input voltage monitoring circuit 16 generates, based on a change in the input voltage applied to the input electrode of the piezoelectric transformer 10 and a frequency component of a feedback voltage corresponding to the output voltage of the piezoelectric transformer 10, an optimal control signal that optimizes efficiency characteristics and step-up characteristics of the piezoelectric transformer 10. The step-down chopper circuit 15 controls switching on and off of the DC power supply voltage Vcc at a predetermined duty ratio based on the optimal control signal from the input voltage monitoring circuit 16.

As in the conventional power supply device, the control IC 12 includes a brightness adjusting circuit 121, a standard voltage setting unit 122, an integration circuit 123, and an operating amplifier 124. In addition, the control IC 12 also includes a standard voltage setting unit 125 that sets a standard voltage Vref2 in the input voltage monitoring circuit 16, and outputs the standard voltage Vref2. The driving circuit 13 includes a Field Effect Transistor (FET) Tr13 that driven on and off at a predetermined frequency, and a resonant coil L13 that produces a resonant voltage. The standard voltage setting unit 122, the integration circuit 123, and the operating amplifier 124 form a Voltage Controlled Oscillator (VCO). The VCO generates a triangular wave output at a frequency based on a difference between a brightness adjusting voltage of the brightness adjusting circuit 121 and a standard voltage Vref1 of the standard voltage setting unit 122, and outputs the triangular wave output from a terminal of the control IC 12 to a comparing circuit 163 of the input voltage monitoring circuit 16. The standard voltage Vref1 of the standard voltage setting unit 122 is preset as a voltage corresponding to an optimal frequency which optimizes efficiency characteristics and step-up characteristics of the piezoelectric transformer 10. The standard voltage Vref1 causes the VCO to oscillate a frequency which optimizes the efficiency and step-up ratio at a fixed voltage (for example, 3.3 volts) that is regulated to be constant by the step-down chopper circuit 15.

The input voltage monitoring circuit 16 includes a smoothing circuit 161 that smoothes the same voltage as the voltage applied to the piezoelectric transformer 10, a buffer circuit 162 that is subsequently connected to the smoothing circuit 161, and the comparing circuit 163 that is subsequently connected to the buffer circuit 162. The comparing circuit 163 compares the smoothed AC voltage with the standard voltage Vref2, and generates an optimal control signal that optimizes efficiency characteristics and step-up characteristics of the piezoelectric transformer 10. The standard voltage Vref2 is maintained as a constant voltage at a level (for example, 5 volts) preset from the DC power supply voltage Vcc by the control IC 12. The standard voltage Vref2 is supplied as power supply to the buffer circuit 162 and the comparing circuit 163, and is input into a positive terminal of the buffer circuit 162.

The step-down chopper circuit 15 includes an FET Tr15 that switches on and off the DC power supply voltage Vcc from the DC power supply 300 at a predetermined duty ratio based on a monitoring result from the input voltage monitoring circuit 16, a resistance R15 that is connected between a gate terminal of the FET Tr15 and the DC power supply 300, and a diode D15 that is connected to a drain terminal of the FET Tr15.

An operation of the power supply device according to the first embodiment is explained next. First, similarly to the conventional power supply device, an ON signal is input to a bipolar Tr17 via a resistance R171 to which is connected a resistance R172, and power is supplied to the control IC 12 via the bipolar Tr17 to activate the power supply device. While power is supplied to the control IC 12, the DC power supply voltage Vcc from the DC power supply 300 is supplied via the step-down chopper circuit 15 and the driving circuit 13 to the piezoelectric transformer 10. AC current of a predetermined frequency that has been raised by the voltage transfer function of the piezoelectric transformer 10 is supplied to the cold cathode tube 200, thereby lighting up the cold cathode tube 200. In a laptop computer, for example, power from a commercial power supply and power from a battery power supply are frequently switched and used.

In the following, a case is explained where the DC power supply voltage Vcc significantly changes when the cold cathode tube 200 is lit. It is assumed that the DC power supply voltage Vcc changes from AC adapter-input voltage: 17 volts to 22 volts to battery input voltage: 6 volts to 8 volts. The comparing circuit 163 of the input voltage monitoring circuit 16 compares the changed input voltage with the triangular wave output from the control IC 12 to generate an optimal control signal, and based on the optimal control signal, controls switching of the FET Tr15 of the step-down chopper circuit 15. Based on the feedback voltage corresponding to the output voltage of the piezoelectric transformer 10 to the cold cathode tube 200 and the standard voltage Vref1, the comparing circuit 163 constantly monitors the voltage of a predetermined frequency applied to the piezoelectric transformer 10 by comparing the voltage with a frequency component oscillated from the VCO.

Due to the switching operation of the FET Tr15, regardless of a change in the DC power supply voltage Vcc from the DC power supply 300, the piezoelectric transformer 10 can be constantly applied with the fixed voltage (specified voltage) of the predetermined frequency.

The optimal control signal generated by the input voltage monitoring circuit 16 controls the step-down chopper circuit 15 such that efficiency characteristics and step-up characteristics of the piezoelectric transformer 10 are nearly optimal. The efficiency characteristics of the piezoelectric transformer 10 are represented by a ratio of the output voltage and the input voltage of the piezoelectric transformer 10. In the embodiment, the cold cathode tube 200 is used as a load supplied with output of the piezoelectric transformer 10, and the output current is controlled to be constant by a feedback circuit consisting of the current detecting circuit 11, the brightness adjusting circuit 121, the integration circuit 123, the operating amplifier 124, and the driving circuit 13. Because the output current of the piezoelectric transformer 10, which has been controlled to be constant, is a known value, the input voltage monitoring circuit 16 simply monitors the input power of the piezoelectric transformer 10 to calculate the efficiency characteristics of the piezoelectric transformer 10 based on a ratio of the input power and the output power based on the known output current.

The step-up characteristics of the piezoelectric transformer 10 include individual properties of each element (or the same type of elements) of the piezoelectric transformer 10, and can be calculated as an approximation specified by experimental data obtained by previously driving (or simulating) the piezoelectric transformer 10. The input voltage monitoring circuit 16 simply monitors the input voltage of the piezoelectric transformer 10, and calculates the step-up characteristics of the piezoelectric transformer 10 using the approximation as a reference.

Further, the input voltage monitoring circuit 16 arbitrarily changes frequencies of the efficiency characteristics and the step-up characteristics of the piezoelectric transformer 10 (see FIG. 3A), and detects an optimal characteristic frequency $P_0$ corresponding to optimal efficiency characteristics and a resonant frequency $Q_0$ corresponding to optimal step-up characteristics. Next, the input voltage monitoring circuit 16 specifies a control standard frequency R that is a frequency between the optimal characteristic frequency $P_0$ and the resonant frequency $Q_0$ (see FIG. 3B), and generates an optimal control signal such that the piezoelectric transformer 10 is driven at a frequency the same as the control standard frequency R. The optimal control signal is output to the step-down chopper circuit 15. The step-down chopper circuit 15 is drive-controlled based on the optimal control signals, and outputs the DC power supply voltage Vcc from the DC power supply 300 at a predetermined duty ratio to perform step-down control.

In other words, the input voltage monitoring circuit 16 sets the oscillating frequency of the VCO to greater than the resonant frequency $Q_0$, and changes the frequencies in a range above the resonant frequency $Q_0$. In the changing frequencies, the input voltage monitoring circuit 16 calculates an approximate voltage that causes the cold cathode tube 200 to consume the least amount of power, and drive-controls the step-down chopper circuit 15 such that the DC power supply voltage Vcc matches the calculated voltage. Thus, the control based on the control standard frequency R enables to constantly achieve the optimum efficiency of the piezoelectric transformer 10 regardless of a significant change in the DC power supply voltage Vcc of the DC power supply 300. Moreover, an increase in voltage applied to the resonant coil L13 can be controlled, which prevents inductance drop.

A positive terminal of the comparing circuit 163 is connected to a terminal (14 pin) of the control IC 12. The terminal (14 pin) is a triangular wave oscillating terminal of the VCO and is an output terminal that outputs a triangular wave signal equivalent to the driving frequency of the piezoelectric transformer 10.

The comparing circuit 163 compares negative terminal input with positive terminal input. The comparing circuit 163 is switched on if the negative terminal input is higher than the positive terminal input, and outputs a control signal from the FET Tr15. At this time, instead of the DC voltage, a Pulse Width Modulation (PWM) waveform that is repeatedly switched on and off is required as an output waveform to drive the FET Tr15, and the positive terminal of the comparing circuit 163 is connected to the terminal (14 pin) of the control IC 12. The buffer circuit 162 determines a threshold voltage from the inductance of the resonant coil L13. The threshold voltage is set such that the piezoelectric transformer 10 operates at the control standard frequency R with optimal driving efficiency and step-up ratio. Consequently, the piezoelectric transformer 10 is always driven at the optimal control standard frequency R.

Figure 4:
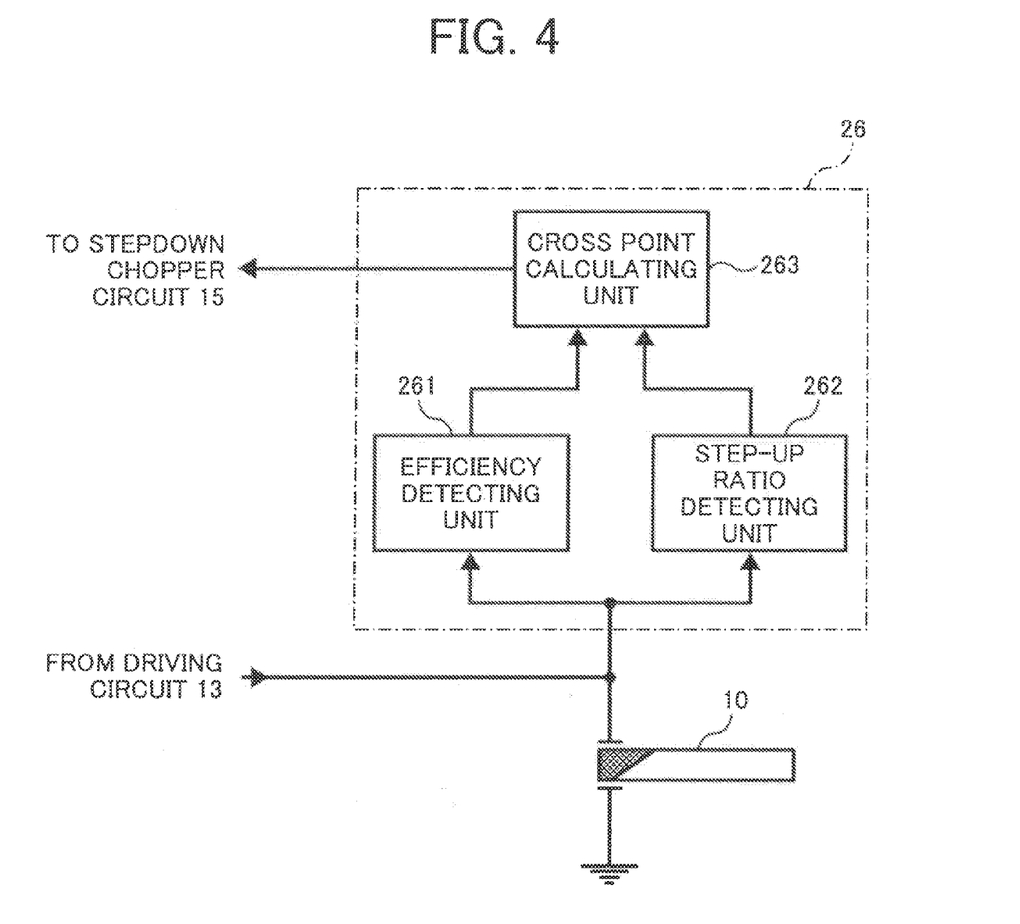
FIG. 4 is a block diagram of an input voltage monitoring circuit of a power supply device according to a second embodiment of the present invention.

A power supply device according to a second embodiment of the present invention is explained with reference to FIGS. 4 and 5. FIG. 4 is a block diagram of an input voltage monitoring circuit in the power supply device. FIGS. 5A and 5B are graphs of control characteristics of the input voltage monitoring circuit.

Similarly to the power supply device according to the first embodiment, the power supply device according to the second embodiment includes the piezoelectric transformer 10, the current detecting circuit 11, the control IC 12, the driving circuit 13, and the step-down chopper circuit 15. In addition, the power supply device of the second embodiment includes an input voltage monitoring circuit 26 in place of the input voltage monitoring circuit 16. The input voltage monitoring circuit 26 includes an efficiency detecting unit 261 that obtains an extreme value of the efficiency of the piezoelectric transformer 10, a step-up ratio detecting unit 262 that obtains an extreme value of the step-up ratio of the piezoelectric transformer 10, and a cross point calculating unit 263 that substantially matches levels of the detected extreme values and calculates cross points of the plots of the efficiency and the step-up ratio. The input voltage monitoring circuit 26 uses the cross points as a monitoring result to control the step-down chopper circuit 15.

An operation of the power supply device according to the second embodiment is explained next. First, the power supply device is activated as in the first embodiment, and the cold cathode tube 200 is supplied with AC current of a predetermined frequency and lights up.

In the following, a case is explained where the DC power supply voltage Vcc significantly changes when the cold cathode tube 200 is lit. It is assumed that the DC power supply voltage Vcc changes from AC adapter-input voltage: 17 volts to 22 volts to battery input voltage: 6 volts to 8 volts. The standard voltage setting unit 125 of the input voltage monitoring circuit 26 obtains an extreme value P1 of driving efficiency characteristics of the piezoelectric transformer 10 from the input current and the input voltage after change by differential calculation (see FIG. 5A). In the differential calculation of the extreme value P1, the frequency of the driving efficiency characteristics is arbitrarily changed, and, from respective values (percentage) of efficiency obtained at multiple sampling frequencies, a function of frequency is calculated as an approximate formula as follows:

$E(f)=af^2+bf+c.$

The derivative of the function is calculated by the following expression.

$$E'(f) = \left[\frac{dE}{df}\right] = 0 \quad (1)$$

Figure 5A:
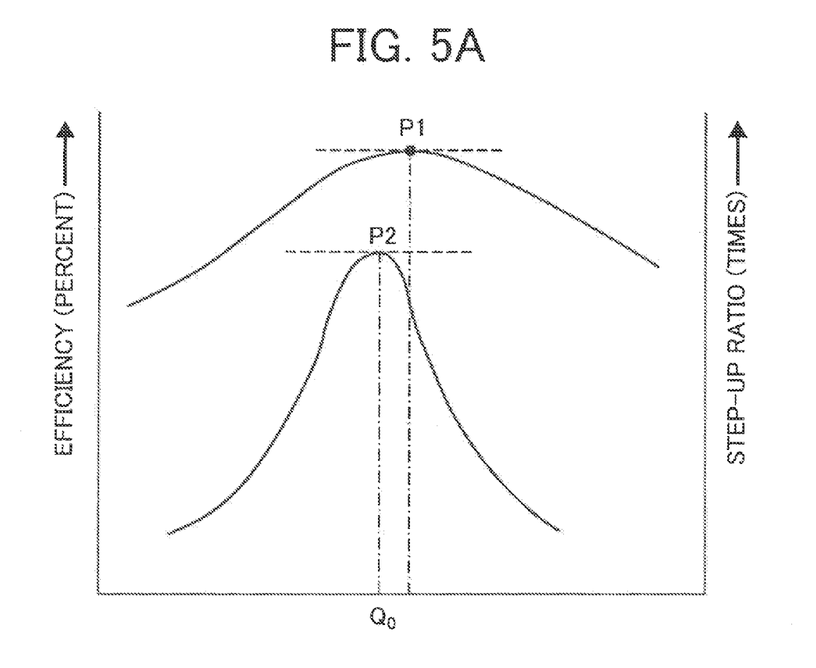
FIG. 5A is a graph of control characteristics of the input voltage monitoring circuit shown in FIG. 4.

The step-up ratio detecting unit 262 of the input voltage monitoring circuit 26 calculates an extreme value P2 of the resonant frequency $Q_0$ of the piezoelectric transformer 10 from the input current and the input voltage after change by differential calculation (see FIG. 5A). As in the case of the driving efficiency characteristics, in the differential calculation of the extreme value P2, the frequency of resonant frequency characteristics is arbitrarily changed, and, from respective values (times) of the step-up ratio obtained at multiple sampling frequencies, a function of frequency is calculated as an approximate formula as follows $S(f)=a'f^2+b'f+c'.$ The derivative of the function is calculated by the following expression.

$$S'(f) = \left[\frac{dS}{df}\right] = 0 \quad (2)$$

Figure 5B:
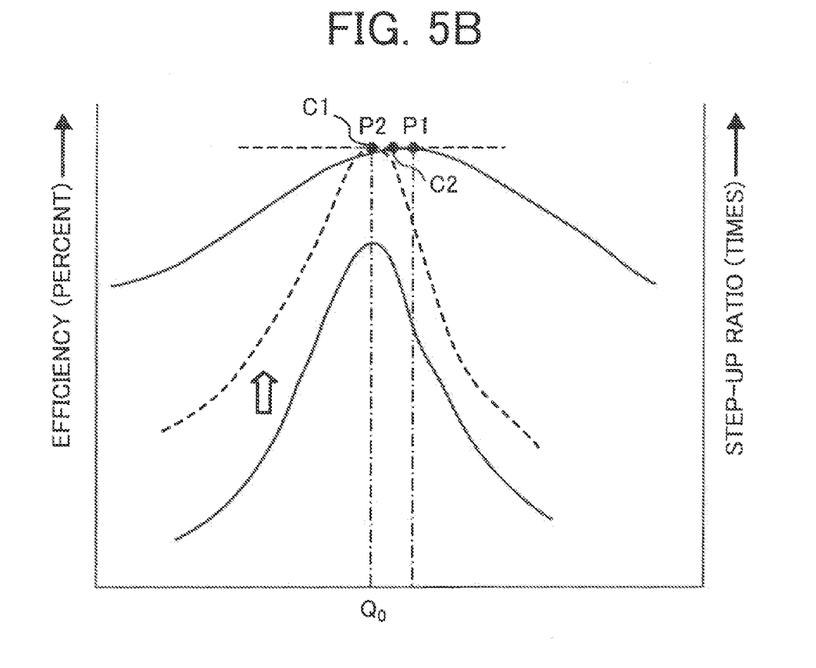
FIG. 5B is another graph of control characteristics of the input voltage monitoring circuit.

To match ranges of the calculated P1 and P2, the cross point calculating unit 263 moves any one of the functions E(f) and S(f) of the frequency by (P1−P2)=d (moves in the direction of the central arrow shown in FIG. 5B). The cross point calculating unit 263 obtains cross points C1 and C2 by solving simultaneous equations about the functions E(f) and S(f) of the frequency that are obtained by the aforementioned movement (see FIG. 5B). For example, if S(f) of the resonant frequency characteristics is moved by +d, solutions of the simultaneous equations $E(f)=af^2+bf+c$ and $S(f)=a'f^2+b'f+(c+d)$ are obtained as the cross points C1 and C2, respectively. From the calculated cross points C1 and C2, the input voltage monitoring circuit 26 specifies the cross point C2 that is higher than the resonant frequency $Q_0$, and drive-controls the step-down chopper circuit 15 to achieve the frequency of the cross point C2.

In the power supply device explained in the first and the second embodiments, an electrical element includes the piezoelectric transformer 10 with a voltage resonant circuit using an inductance component and a capacitance component. However, the electrical element can include an electromagnetic induction heating unit.

In a resonance type switching power supply such as the power supply device according to the present invention, the addition of inductance L and capacitance C to a closed circuit that includes a load such as FET or an Insulated Gate Bipolar Transistor (IGBT) enables to delay voltage or current rise. Although either the voltage or the current is zero during a switching period and therefore loss is zero, efficiency of the entire switching power supply is not always enhanced due to occurrence of internal loss of the added inductance L or capacitance C. However, because of the structure and the objectives, a power supply that uses the piezoelectric transformer 10 or an Induction Heating (IH) power supply is inevitably an LC resonant power supply.

Figure 6:
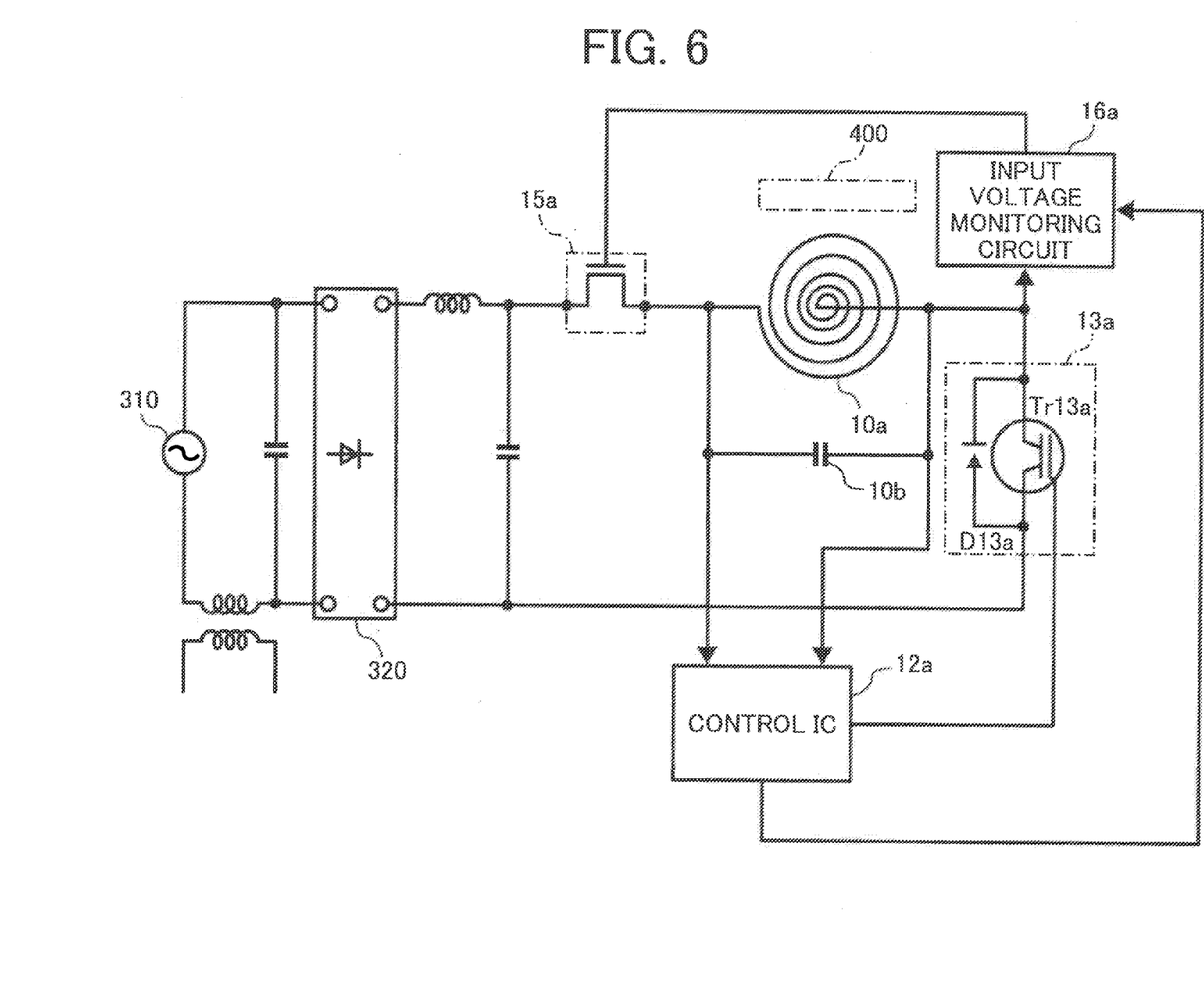
FIG. 6 is a block diagram of a power supply device that is applied to an IH power supply according to another embodiment of the present invention.

FIG. 6 is a block circuitry diagram of the power supply device according to another embodiment of the present invention, which is applied to the IH power supply device. The power supply device includes a control IC 12a (equivalent to the control IC 12), a driving circuit 13a (equivalent to the driving circuit 13), a step-down chopper circuit 15a (equivalent to the step-down chopper circuit 15), and an input voltage monitoring circuit 16a (equivalent to the input voltage monitoring circuit 16). In addition, the power supply device includes an AC power supply 310, a rectifier circuit 320, a heating coil 10a, and a resonant capacitor 10b. The rectifier circuit 320 rectifies AC current that is supplied from the AC power supply 310 to DC current. The step-down chopper circuit 15a adjusts the DC current to a predetermined voltage, and outputs the DC current to the heating coil 10a and the resonant capacitor 10b that form an IH device.

The heating coil 10a of the IH device acts as an inductance and forms a parallel LC resonant circuit together with the resonant capacitor 10b connected in parallel thereto. The driving circuit 13a includes a diode D13a and a FET Tr13a formed with the IGBT, which are connected in parallel. The FET Tr13a and the diode D13a are serially connected to the heating coil 10a and the resonant capacitor 10b.

An operation of the power supply device as the IH power supply according to the embodiment is explained next. First, the rectifier circuit 320 eliminates power supply noise from AC current supplied from the AC power supply 310, rectifies the AC current, and supplies smoothed DC current to the step-down chopper circuit 15a. As in the first and the second embodiments, based on an optimal control signal generated by the input voltage monitoring circuit 16a, the step-down chopper circuit 15a carries out step-down control of the DC voltage to switch on and off the DC voltage at a predetermined duty ratio, and outputs the DC voltage to the heating coil 10a and the resonant capacitor 10b.

Based on arithmetic control of the control IC 12a, the driving circuit 13a is drive-controlled, and the DC voltage is applied to the heating coil 10a and the resonant capacitor 10b that form the IH device. When the FET Tr13a of the driving circuit 13a is turned off, the resonant capacitor 10b of the IH device is applied with the DC voltage, thereby being charged. When the FET Tr13a of the driving circuit 13a is turned on, the DC voltage is applied to the heating coil 10a at different timing than discharge timing from the resonant capacitor 10b.

Due to switching driving of the FET Tr13a, the voltage applied to the heating coil 10a and the resonant capacitor 10b is converted into a high frequency of about 20 kHz to 40 kHz. If an AC magnetic field that is generated in the heating coil 10a due to the high frequency is applied to a metal body 400, an induced current flows in the metal body 400 due to induced electromotive force, and the metal body 400 is heated.

The voltage that is applied to the heating coil 10a and the resonant capacitor 10b is input to the input voltage monitoring circuit 16a. Based on the input voltage and the control signal of the control IC 12a, the input voltage monitoring circuit 16a generates optimal control signal, and, based on the optimal control signal, drive-controls the step-down chopper circuit 15a. As in the first and the second embodiments, the control signal of the control IC 12a includes the frequency component that is generated by the parallel LC resonant circuit consisting of the heating coil 10a and the resonant capacitor 10b.

Thus, in the embodiment, the input voltage monitoring circuit 16a monitors the voltage that is applied to the heating coil 10a, and drive-controls the step-down chopper circuit 15a. Thereby, it is possible to maintain voltage constant, and ensure stable induced heating of the heating coil 10a regardless of a change in the voltage of the AC power supply 310 and a subsequent change in the DC voltage from the rectifier circuit 320.

As set forth hereinabove, according to embodiments of the present invention, a DC power supply voltage that is converted by a driving unit into an AC voltage of a predetermined frequency is applied to an electrical element and boosted by a voltage resonating unit of the electrical element. Based on a change in an input voltage of the electrical element and a frequency component of a feedback voltage corresponding to the voltage boosted and output from the electrical element, an input voltage monitoring circuit generates an optimal control signal. According to the optimal control signal, the DC power supply voltage is controlled such that a step-down chopper circuit is switched on and off at a predetermined duty ratio. Thereby, characteristics of the electrical element are optimized.

Moreover, the electrical element includes a piezoelectric transformer. Based on the frequency component of the feedback voltage corresponding to the output voltage of the piezoelectric transformer, the input voltage monitoring circuit monitors a change in the input voltage of the piezoelectric transformer. Thereby, characteristics of the piezoelectric transformer are optimized. Thus, it is possible to maintain high efficiency of the piezoelectric transformer and ensure stable power supply regardless of a significant change in the input voltage.

Furthermore, the electrical element includes an electromagnetic induction heating unit. Based on the frequency component of the feedback voltage corresponding to the output voltage of the electromagnetic induction heating unit, the input voltage monitoring circuit monitors a change in the input voltage of the electromagnetic induction heating unit. Thereby, characteristics of the electrical element are optimized. Thus, it is possible to maintain high efficiency of the electromagnetic induction heating unit and ensure stable power supply regardless of a significant change in the input voltage.

Moreover, the input voltage monitoring circuit monitors the efficiency and step-up ratio of the piezoelectric transformer. Besides, an efficiency detecting unit calculates an extreme value of efficiency of the piezoelectric transformer. A step-up ratio detecting unit calculates an extreme value of the step-up ratio of the piezoelectric transformer. A cross point calculating unit substantially matches levels of the extreme values, and obtains cross points of plots of the efficiency and the step-up ratio. Based on the cross points, the input voltage monitoring circuit generates an optimal control signal to control the step-down chopper circuit. Thereby, efficiency characteristics and step-up characteristics of the piezoelectric transformer are optimized. Thus, it is possible to maintain high efficiency of the piezoelectric transformer and ensure stable power supply regardless of a significant change in the input voltage.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device, comprising:
an electrical element including
   a driving unit that converts a direct current power supply voltage into a sinusoidal alternating current voltage of a predetermined frequency; and
   a voltage resonating unit that receives the sinusoidal alternating current voltage output from the driving unit through an input electrode, boosts the sinusoidal alternating current voltage to a predetermined level, and outputs boosted voltage to a load based on an inductance component and a capacitance component;
an input voltage monitoring circuit including
   a comparing unit configured to also receive the sinusoidal alternating current inputted to the input electrode of the voltage resonating unit from the driving unit, and to compare a signal directly representing the sinusoidal alternating current voltage inputted to the input electrode of the voltage resonating unit with a reference voltage signal generated by a standard voltage setting unit, to output an optimal control signal that drives a switch in a step-down chopper circuit; and
the step-down chopper circuit that controls switching on and off of the direct current power supply voltage at a duty ratio based on the optimal control signal, the step-down chopper including the switch that receives the optimal control signal from the input voltage monitoring circuit and turns on or off based on a voltage level of the optimal control signal.

2. The power supply device according to claim 1, wherein the electrical element includes a piezoelectric transformer, and
the input voltage monitoring circuit monitors an input voltage that is applied to an input electrode of the piezoelectric transformer.

3. The power supply device according to claim 1, wherein the electrical element includes an electromagnetic induction heating unit, and
the input voltage monitoring circuit monitors an input voltage that is applied to an input electrode of the electromagnetic induction heating unit.

4. The power supply device according to claim 2, wherein the input voltage monitoring circuit monitors efficiency and step-up ratio of the piezoelectric transformer, and generates the optimal control signals based on a frequency between frequencies corresponding to highest efficiency and highest step-up ratio.

5. The power supply device according to claim 1, wherein the comparing unit outputs a pulse width modulation waveform.

6. A power supply device, comprising:
an electrical element that includes
    a driving unit that converts a direct current power supply voltage into an alternating current voltage of a predetermined frequency; and
    a piezoelectric transformer that receives the alternating current voltage through an input electrode, boosts the alternating current voltage to a predetermined level, and outputs boosted voltage to a load based on an inductance component and a capacitance component;
an input voltage monitoring circuit including
    an efficiency detecting unit that obtains an extreme value of efficiency of the piezoelectric transformer;
    a step-up ratio detecting unit that obtains an extreme value of a step-up ratio of the piezoelectric transformer; and
    a cross point calculating unit that substantially matches levels of detected extreme values, and obtains cross points of plots of the efficiency and the step-up ratio, wherein
    the input voltage monitoring circuit controls a step-down chopper circuit based on the cross points and generates, based on a change in input voltage of the electrical element and a frequency component of a feedback voltage corresponding to the voltage output from the electrical element, an optimal control signal that substantially optimizes efficiency characteristics and step-up characteristics of the electrical element, and monitors an input voltage applied to an input electrode of the piezoelectric transformer; and
the step-down chopper circuit that controls switching on and off of the direct current power supply voltage at a predetermined duty ratio based on the optimal control signal.

* * * * *